United States Patent [19]

Maruyama et al.

[11] Patent Number: 4,716,468

[45] Date of Patent: Dec. 29, 1987

[54] APPARATUS FOR CONTROLLING THE ELECTRON BEAM IN A TELEVISION CAMERA TUBE

[75] Inventors: Masanori Maruyama, Kokubunji; Kenji Takahashi, Kanagawa; Koji Kudo, Hachioji; Masanori Hombaugh, Mitaka; Shusaku Nagahara, Hachioji, all of Japan

[73] Assignees: Hitachi, Ltd.; Hitachi Denshi Kabushiki Kaisha, both of Tokyo, Japan

[21] Appl. No.: 854,865

[22] Filed: Apr. 23, 1986

[30] Foreign Application Priority Data

Apr. 24, 1985 [JP] Japan .................................. 60-86400

[51] Int. Cl.$^4$ .............................................. H04N 5/235

[52] U.S. Cl. ...................................... 358/219; 358/217

[58] Field of Search ........................ 358/219, 217, 218; 250/213 VT

[56] References Cited

U.S. PATENT DOCUMENTS

| | | | |
|---|---|---|---|
| 3,931,466 | 1/1976 | Van Den Berg | 358/218 |
| 4,149,110 | 4/1979 | Dallos | 358/219 |
| 4,166,281 | 8/1979 | Dischert et al. | 358/219 |
| 4,190,865 | 2/1980 | Bendell | 358/219 |
| 4,249,215 | 2/1981 | Himmelbauer et al. | 358/217 |
| 4,322,622 | 3/1982 | Nakamura et al. | 358/219 |
| 4,379,310 | 4/1983 | Bendell | 358/219 |

*Primary Examiner*—Gene Z. Rubinson
*Assistant Examiner*—Stephen Brinich
*Attorney, Agent, or Firm*—Antonelli, Terry & Wands

[57] ABSTRACT

A camera tube device for use in, for example, a television camera comprises a cathode emitting electrons, and a first grid and a second grid having respective apertures for converging the electrons emitted from the cathode into a fine electron beam. The aperture of the second grid is sufficiently smaller than that of the first grid and plays an important role for the formation of the electron beam. The electron beam scans a target carrying a charge pattern corresponding to the luminous intensity of an object. Voltages applied to the first and second grids are controlled so as to provide the electron beam quantity corresponding to the luminous intensity of the object forming the charge pattern of the target.

8 Claims, 5 Drawing Figures

APPARATUS FOR CONTROLLING THE ELECTRON BEAM IN A TELEVISION CAMERA TUBE

BACKGROUND OF THE INVENTION

This invention relates to a device using a television camera tube, and more particularly to a television camera tube device suitable for controlling the quantity of electron beam current depending on the luminous intensity of an object.

In a vidicon type television camera tube, a charge pattern corresponding to the luminous intensity of a moving object is produced on a photoconductive layer target, and an electron beam generated from an electron gun is directed to scan the photoconductive layer target, thereby to cause successive discharge of the charge pattern. A charge current corresponding the above discharge is taken out of the television camera tube as a signal. All of the charges produced on the target by the object in each beam scanning operation are not completely discharged after the beam scanning. As a result, an unfavorable signal corresponding to the residual charges appears as a beam discharge lag in the next and succeeding scanning thereby degrading the picture quality of the moving object. Especially, in a television camera tube using a blocking type photoconductive layer target, the beam discharge lag is caused principally by a capacitive signal lag having a time constant determined by the product of the electrostatic capacitance of the photoconductive layer and the beam resistance of the scanning electron beam. The beam resistance is equivalent to the velocity distribution of the electron group forming the electron beam. Therefore, it is essentially required to constrict the velocity distribution of the electron group forming the electron beam in order to minimize the beam discharge lag.

The electron group emitted from the cathode of the electron gun has a velocity distribution in the form of the Maxwell's distribution. It is known that, in the course of formation of a fine electron beam, the current density of the beam increases, and the velocity distribution of the beam is broadened by energy relaxation due to the Coulomb's force acting between the electrons. This phenomenon is called the Boersh effect, and the broadening rate of the velocity distribution of the beam is generally proportional to $J(z)^{1/2}$, when $J(z)$ is the beam current density on the tube axis.

Therefore, in a television camera tube intended to minimize the beam discharge lag, it is necessary to prevent an undesirable increase in the beam current density as much a possible. For this purpose, a diode type electron gun has been proposed in which a first grid opposing the cathode is operated at a voltage positive relative to the cathode to cause emission of electrons from the cathode in parallel to the tube axis, thereby generating a laminar flow electron beam which does not form a crossover having a high current density. (Refer to, for example, U.S. Pat. No. 3,894,261.) However, in such a diode type electron gun generating a laminar flow electron beam, the beam current quantity is proportional to the emission current density of the cathode, and, therefore, the current density of the cathode becomes extremely high for obtaining a large beam current. Thus, it has been difficult to permit the operation of automatic beam optimizer (ABO) in which the dynamic range of the beam current quantity is widened so as to control the beam quantity according to the luminous intensity of an object.

SUMMARY OF THE INVENTION

An object of the present invention is to provide a television camera tube device which can eliminate the disadvantages of the diode type electron gun used for generation of the laminar flow beam and which can expand the dynamic range of the beam current quantity to permit the operation of the ABO and to accomplish the low lag characteristic.

Another object of the present invention is to provide a television camera tube device which can stably carry out the operation of the ABO.

In the television camera tube device of the present invention, an electron gun is constituted by a cathode emitting electrons, a first grid having an aperture, and a second grid having an aperture smaller than that of the first grid, and the voltages applied to the first and second grids are controlled depending on the luminous intensity of an object.

According to the present invention, the $\gamma$ characteristic (the relation between the voltages applied to the first and second grids and the electron beam quantity) of the television camera tube can be easily controlled by controlling the voltages applied to the first and second grids. Therefore, a television camera tube device can be provided which can expand the dynamic range of the beam current quantity to permit the operation of the ABO.

These and other objects, features and advantages of the present invention will become more apparent upon a reading of the following detailed specification and drawings.

BRIEF DESCRIPTION THE DRAWINGS

DESCRIPTION OF THE PREFERRED EMBODIMENTS

The present invention will now be described in detail with reference to the drawings.

Figure 1:
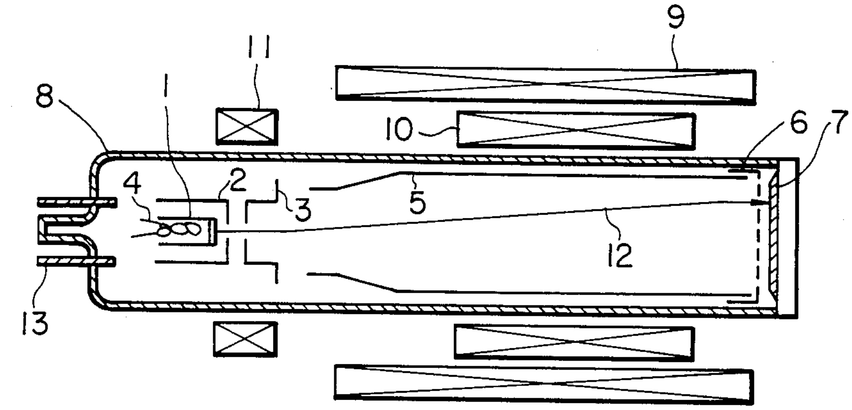
FIG. 1 shows schematically the structure of a Vidicon type television camera tube device to which the present invention is applied.

FIG. 1 shows schematically the structure of a Vidicon type television camera tube device to which the present invention is applied. Referring to FIG. 1, the television camera tube device includes a cathode 1, a heater 4, a first grid 2, a second grid 3, a third grid 5, a fourth grid 6 having a mesh electrode, and a photoconductive layer target 7, all of which are disposed inside a vacuum envelope 8. The television camera tube device further includes a focusing coil 9, a deflection coil 10 and an alignment coil 11. Electrons emitted from the cathode 1 are converged by apertures of the first and second grids 2 and 3 into a fine electron beam 12. The electron beam 12 is focused by an electromagnetic lens provided by the focusing coil 9 to make landing on the photoconductive layer target 7 to scan the photoconductive layer target 7 while being deflected by a magnetic field produced by the deflection coil 10. Voltages are externally applied to the electrodes through a stem 13 provided at one end of the vacuum envelope 8. FIG. 1 illustrates a television camera tube device of electromagnetic focusing and electromagnetic deflection type, by way of example. However, the present invention is also applicable to a television camera tube device of any other type such as an electromagnetic focusing and electrostatic deflection type, an electrostatic focusing and electromagnetic deflection type or an electrostatic focusing and electrostatic deflection type.

Figure 2:
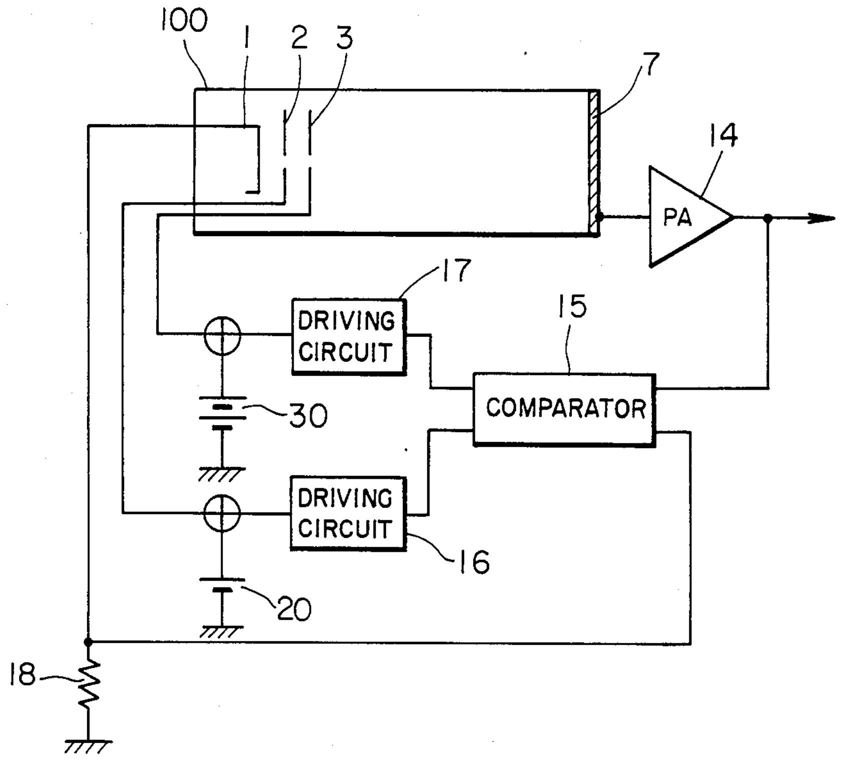
FIG. 2 is a block diagram of one form of a beam control circuit preferably employed in an embodiment of the present invention.

FIG. 2 shows a preferred embodiment of the present invention. In FIG. 2, principal parts of the television camera tube in FIG. 1 are only shown, and other parts are not shown for simplicity. It will be apparent from FIG. 2 that the television camera tube 100 includes the electron gun composed by the cathode 1, first grid 2 and second grid 3, and the photoconductive layer target 7 scanned with the electron beam emitted from the electron gun. Referring to FIG. 2, a signal derived as a charge current from the target 7 is led to the exterior of the television camera tube 100 after being amplified by a preamplifier 14. The cathode 1 is grounded through a cathode resistor 18. A differential amplifier or comparator 15 receives the output signal of the preamplifier 14 and the signal appearing across the cathode resistor 18 as its inputs and arithmetically processes or compares these inputs. The resultant output signal from the comparator 15 is applied to driving circuits 16 and 17. The first driving circuit 16 converts the output signal of the comparator 15 into a driving signal voltage which is applied to the first grid 2 in a relation superposed on the output voltage of a first DC voltage source 20. The second driving circuit 17 converts the output signal of the comparator 15 into a control signal voltage which is applied to the second grid 3 in a relation superposed on the output voltage of a second DC voltage source 30. In the manner described above, the voltages applied to the first and second grids 2 and 3 are controlled to change the beam current quantity. In an electron gun of a television camera tube, the accelerating electric field is generally intensified to increase the beam current quantity when the voltage applied to the second grid increases. Therefore, in the embodiment of the present invention which controls the voltage applied to the second grid 3, the absolute beam generation capacity of the television camera tube 100 is controlled. Thus, the embodiment of the present invention is advantageous in that the dynamic image of the beam current quantity in clamping function. The non-linear amplifier 19 receives the output signal of the preamplifier 14 only as its input and arithmetically processes the input. The resultant output signal of the non-linear amplifier 19 is applied to the driving circuits 16 and 17. The driving circuits 16 and 17 convert the output signal of the non-linear amplifier 19 into a driving signal voltage and a control signal voltage which are applied to the grids 2 and 3 in a relation superposed on the output voltages of the DC voltage sources 20 and 30 respectively, as in the television camera tube 100 can be expanded, and the controllable range of the ABO device can be widened. The ABO device shown in FIG. 2 is based on a so-called equivalent return beam feedback method.

Figure 3:
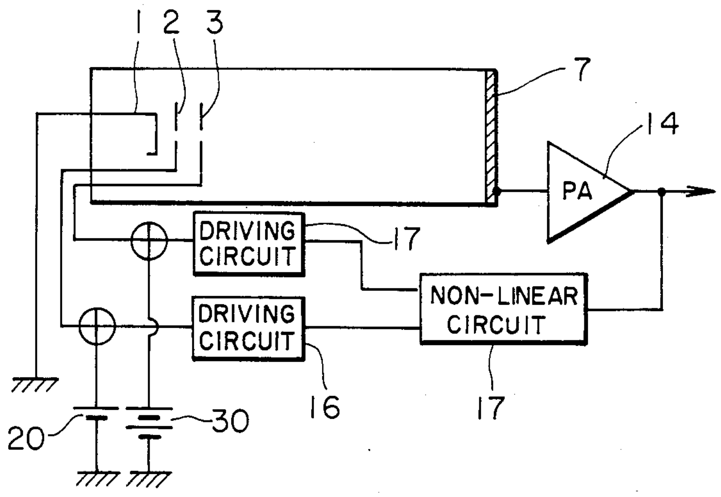
FIG. 3 is a block diagram of a modification of the beam control circuit shown in FIG. 2.

FIG. 3 shows another embodiment or a modification of the embodiment shown in FIG. 2. The ABO device shown in FIG. 3 is based on a so-called signal current feedback method. In the embodiment shown in FIG. 3, the comparator 15 shown in FIG. 2 is replaced by a non-linear amplifier 19 having a case of the embodiment shown in FIG. 2. The ABO device shown in FIG. 3 is advantageous in that the circuit structure is simplified.

Figure 4:
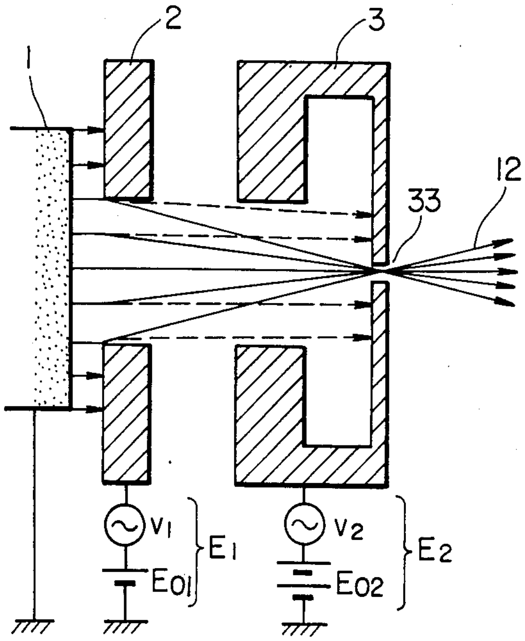
FIG. 4 is an enlarged sectional view of part of an electron gun preferably employed in the present invention.

FIG. 4 shows the structure of part of an electron gun of a television camera tube preferably employed in the ABO device of the present invention. Referring to FIG. 4, the electron gun includes a cathode 1, a first grid 2 and a second grid 3 and generates an electron beam 12. A voltage $E_1$ positive relative to the cathode 1 is applied to the first grid 2. The second grid 3 has a very small aperture 33, and a voltage $E_2$ positive relative to the cathode 1 is applied to the second grid 3. By controlling the voltages $E_1$ and $E_2$, a laminar flow electron beam as shown by the dotted lines can be changed to a concentrated electron beam (a beam forming a crossover) as shown by the solid lines. In a standard operation in which the luminous intensity of an object is generally not so high, it is desirable to generate the laminar flow electron beam from the aspects of the resolution and beam discharge lag. In such a case, the value of beam current passing through the aperture 33 of the second grid 3 is small. On the other hand, when the luminous intensity of the object is high, it is preferable to generate the concentrated beam for increasing the beam current so as to prevent degradation of the picture quality due to a comet-tail phenomenon. The voltages $E_1$ and $E_2$ applied to the first and second grids 2 and 3 are provided by superposing control signal voltages $v_1$ and $v_2$ on DC voltages $E_{01}$ and $E_{02}$ respectively.

Figure 5:
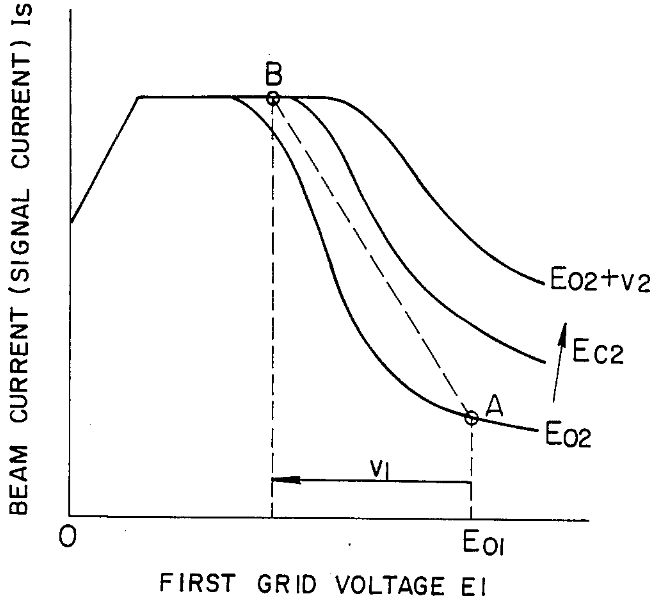
FIG. 5 is a graph showing the drive characteristic of the electron gun shown in FIG. 4.

FIG. 5 shows the drive characteristic for the electron gun shown in FIG. 4. In FIG. 5, the voltage $E_2$ applied to the second grid 3 is taken as a parameter to show how the beam current varies relative to the voltage $E_1$ applied to the first grid 2. This beam current is expressed in terms of the signal current derived from the target of the television camera tube, and the curve has a flat portion attributable to saturation of the photoconductive layer relative to the luminous intensity of the object.

Point A is the usual operation point, and $E_{01}$ is set at 10 to 50 V, while $E_{02}$ is set at 100 to 300 V. When the luminous intensity of the object is high, the beam current is to be increased to the value at a point B. For this purpose, a negative control voltage $v_1$ is superposed on the first DC voltage $E_{01}$, and a positive control voltage $v_2$ is superposed on the second DC voltage $E_{02}$, so that the drive curve during the ABO operation can be made generally rectilinear as indicated by the broken line. Thus, according to the illustrated embodiments, the voltages applied to the first and second grids are dynamically controlled, so that the overall controllable range of the beam current can be widened, and the drive curve can be made substantially rectilinear. Therefore, the ABO operation can be stably carried out, and an inexpensive television camera device possessing the ABO function can be provided.

In the embodiments, a diode type electron gun, in which a positive DC voltage is applied to its first grid, is illustrated by way of example. It is apparent that the present invention is also equally effectively applicable to a triode type electron gun in which a negative DC voltage is applied to its first grid.

The cathode 1 in the television camera tube device according to the present invention is preferably a barium impregnated cathode capable of emission of an electron beam of high current density. Such a cathode is provided by impregnating a porous tungsten pellet with a mixture of BaO, CaO and $Al_2O_3$ (having a standard composition ratio of 4:1:1), and welding the pellet to the top of a sleeve of material such as tantalum. A cathode obtained by coating an element such as Ir or Os on the surface of the porous tungsten pellet for improving the electron emission characteristic is also preferable. The operating temperature of these impregnated cathodes is as high as 900° to 1,100° $C._B$ (luminance temperature). A high melting point material such as tantalum is preferably used to form the first grid 2, since the temperature of the cathode 1 disposed opposite thereto is high, and a large current flows into the first grid 2.

We claim:

1. A television camera tube device comprising:

a target disposed adjacent to one end of a camera tube to produce a charge pattern corresponding to the luminous intensity of an object;

an electron gun disposed adjacent to the other end of the camera tube to generate an electron beam for scanning said target, said electron gun including a cathode emitting electrons, a first grid disposed between said cathode and said target to be applied with a first predetermined voltage and having a first aperture, and a second grid disposed between said first grid and said target to be applied with a second predetermined voltage and having a second aperture smaller than said first aperture; and means for controlling the voltages applied to said first and second grids for providing the electron beam quantity corresponding to the luminous intensity of the object forming the charge pattern on said target;

wherein the voltages applied to said first and second grids are both positive relative to said cathode, and said voltage control means decreases the voltage applied to said first grid and increases the voltage applied to said second grid, so that a drive curve changes substantially rectilinearly relative to an increase in the luminous intensity of said object.

2. A television camera tube device as claimed in claim 1, wherein the first predetermined voltage applied to said first grid lies within the range of 10 V and 50 V, and the second predetermined voltage applied to said second grid lies within the range of 100 V and 300 V.

3. A television camera tube device comprising:

a target disposed adjacent to one end of a camera tube to produce a charge pattern corresponding to the luminous intensity of an object;

an electron gun disposed adjacent to the other end of the camera tube to generate an electron beam for scanning said target, said electron gun including a cathode emitting electrons, a first grid disposed between said cathode and said target to be applied with a first predetermined voltage and having a first aperture, and a second grid disposed between said first grid and said target to be applied with a second predetermined voltage and having a second aperture smaller than said first aperture; and means for controlling the voltages applied to said first and second grids for providing the electron beam quantity corresponding to the luminous intensity of the object forming the charge pattern on said target;

wherein the voltages applied to said first and second grids are both positive relative to said cathode, and said voltage control means includes arithmetic processing means for receiving and arithmetically processing a signal derived from said target, which signal is indicative of the luminous intensity of said object, and a signal derived from a cathode resistor connected between said cathode and ground; means for superposing a negative voltage corresponding to the output of said arithmetic processing means on the voltage applied to said first grid; and means for superposing a positive voltage corresponding to the output of said arithmetic processing means on the voltage applied to said second grid.

4. A television camera tube device as claimed in claim 3, wherein said arithmetic processing means is a idfferential amplifier.

5. A television camera tube device comprising:

a target disposed adjacent to one end of a camera tube to produce a charge pattern corresponding to the luminous intensity of an object;

an electron gun disposed adjacent to the other end of the camera tube to generate an electron beam for scanning said target, said electron gun including a cathode emitting electrons, a first grid disposed between said cathode and said target to be applied with a first predetermined voltage and having a first aperture, and a second grid disposed between said first grid and said target to be applied with a second predetermined voltage and having a second aperture smaller than said first aperture; and means for controlling the voltages applied to said first and second grids for providing the electron beam quantity corresponding to the luminous intensity of the object forming the charge pattern on said target;

wherein the voltages applied to said first and second grids are both positive relative to said cathode, and said voltage control means includes means for receiving and arithmetically processing a signal derived from said target, which signal is indicative of the luminous intensity of said target; means for superposing a negative voltage corresponding to the output of said arithmetic processing means on the voltage applied to said first grid; and means for superposing a positive voltage corresponding to the output of said arithmetic processing means on the voltage applied to said second grid.

6. A television camera tube device as claimed in claim 5, wherein said arithmetic processing means is a non-linear amplifier.

7. A television camera tube device as claimed in claim 5, wherein the first predetermined voltage applied to said first grid lies within the range of 10 V and 50 V, and the second predetermined voltage applied to said second grid lies within the range of 100 V and 300 V.

8. A television camera tube device as claimed in claim 1, wherein said cathode is of an impregnated type.

* * * * *